United States Patent [19]

Ishikawa

[11] Patent Number: 5,553,821
[45] Date of Patent: Sep. 10, 1996

[54] COUNTERBALANCING UNIT

[75] Inventor: Masao Ishikawa, Saitama, Japan

[73] Assignee: Heiwa Seiki Kogyo Co., Ltd., Saitama, Japan

[21] Appl. No.: 287,896

[22] Filed: Aug. 9, 1994

[51] Int. Cl.⁶ .................................................. F16M 11/00
[52] U.S. Cl. .................................. 248/292.11; 248/185.1; 248/280.11; 248/648
[58] Field of Search .................... 248/292.11, 297.11, 248/280.1, 185.1, 648, 183.3, 178.1; 352/243; 354/81, 82, 293

[56] References Cited

U.S. PATENT DOCUMENTS

| | | | |
|---|---|---|---|
| 4,083,524 | 4/1978 | O'Connor | 248/183 |
| 4,113,215 | 9/1978 | Stapleton | 248/183 |
| 4,771,979 | 9/1988 | Nakazawa et al. | 248/185 X |
| 4,919,376 | 4/1990 | Uehara et al. | 248/185 |
| 4,959,671 | 9/1990 | Ishikawa | 248/183 X |
| 4,989,814 | 2/1991 | Uehara et al. | 248/185 |
| 5,419,520 | 5/1995 | Ishikawa | 248/185 X |

FOREIGN PATENT DOCUMENTS

| | | | |
|---|---|---|---|
| 3008637 | 9/1981 | Germany | 248/648 |
| 2-27560 | 6/1990 | Japan | |
| 3-13037 | 3/1991 | Japan | |
| 2189042 | 10/1987 | United Kingdom | |

Primary Examiner—Karen J. Chotkowski
Attorney, Agent, or Firm—Wenderoth, Lind & Ponack

[57] ABSTRACT

A counterbalancing unit for a tripod head is assembled along a horizontal shaft. A pair of holders are slidably supported on the horizontal axis and disposed in an inside of a longitudinal member which is perpendicular to a base of a tripod head. One or more compressed elastic bodies are supported between the holders. One or more guide pines are connected with at least one of the holders to move horizontally inward in the longitudinal member together with at least one of the holders when the tripod head is tilted. A rotary member having a cam face at an edge thereof and connected with a strut is rotatably supported on the longitudinal shaft. The rotary member rotates with said strut causing the guide pin(s) to move into the longitudinal member by means of the cam face when the tripod head is tiled. The elastic bodies are compressed between the holders. As a result, the counterbalancing unit generates a restoring force in proportion to a torque created by tilting the tripod head and thereby, the counterbalancing unit allows the tripod head to be stably and smoothly tilted.

6 Claims, 6 Drawing Sheets

COUNTERBALANCING UNIT

BACKGROUND OF THE INVENTION

The present invention relates to a counterbalancing unit. More particularly, the present invention relates to a simple counterbalancing unit for a tripod head capable of generating an appropriate amount of a restoring force in proportion to a torque created while a tripod head is tilted. The unit also allows a photographing device, such as a camera, a video camera or a movie camera, mounted on a tripod head to tilt stably and smoothly. This invention also relates to a counterbalancing unit capable of easily adjusting the restoring force corresponding to various weights of the photographing device.

A tripod head has been conventionally used as a device for fixing a photographing device such as a camera, a video camera or a movie camera on a tripod and for realizing smooth tilting rotation of the photographing device.

A counterbalancing means is incorporated in such a tripod head for preventing the photographing device from quickly rotating and falling when it is tilted downward.

This counterbalancing means is a means in which a restoring force is generated by an elastic body such as a spring in proportion to a torque due to transference of the center of gravity of the photographing device. The restoring force prevents the photographing device from falling and allows it to be tilted stably and smoothly.

A counterbalancing means for a tripod head is disclosed in Japanese Publication No. 27560/90 and Japanese Utility Model Publication No. 13037/91, for example. A crank or cam, each of which rotates eccentrically in accordance with the tilting rotation of the tripod head is applied to the means described in those publications. However, numerous elements have to be considered in a design of the above counterbalancing means. Therefore, the design work is very complex. Further, since the counterbalancing means is a complicated structure, it is expensive to manufacture and the operation thereof is not necessarily satisfactory.

SUMMARY OF THE INVENTION

One object of the present invention is to provide a novel counterbalancing unit for a tripod head capable of generating an appropriate amount of restoring force in proportion to a torque created while a tripod head is tilted. The unit allows a photographing device, such as a camera, a video or a movie camera which is mounted on the tripod head to tilt stably and smoothly.

Another object of the present invention is to simplify the structure of the counterbalancing unit.

Further another object of the present invention is to permit easy adjustment of the restoring force corresponding to various weights of the photographing devices.

These and other objects, features and advantages of the present invention will become apparent by reference to the following detailed description in conjunction with the accompanying drawings.

DETAILED DESCRIPTION OF THE INVENTION

The present invention provides a counterbalancing unit, which includes a central horizontal shaft and a pair of holders slidably supported on the horizontal axis and disposed inside of a longitudinal axis perpendicular to a base of a tripod head.

At least one compressed elastic body is supported between the holders. At least one guide pin is connected with at least one of the holders and horizontally moves inwardly of the longitudinal axis together with at least one of the holders during tilting of the tripod head.

A rotary member having a cam face at an edge thereof and connected with a strut is tiltably supported on the longitudinal axis. The rotary member rotates with the strut causing the guide pin to move inwardly of the longitudinal axis through the engagement with the cam face as the tripod head is tilted. Due to the compression of the elastic body, the counterbalancing unit generates a restoring force in proportion to a torque created during a tilting rotation.

The construction of the present invention provides a suitable restoring force in proportion to a torque created during a tilting rotation of a tripod head, while at the same time simplifying the structure of the counterbalancing unit. A photographing device, such as a camera, a video camera or a movie camera, is tilted stably and smoothly. The counterbalancing unit of the present invention is easier and less costly to manufacture.

As one preferred modification, the present invention provides a counterbalancing unit which includes a knob for adjusting an elastic force of the compressed elastic body. The knob includes a threaded member which engages a threaded hole formed at one end of the central horizontal axis.

Rotation of the knob causes the threaded member to move into the threaded hole and causes the horizontal axis to move in a horizontal direction. Alternatively, the present invention provides a counterbalancing unit, which further includes a knob for adjusting an elastic force of the compressed elastic body. The knob is secured on the horizontal axis and causes the horizontal axis to rotate therewith.

A first threaded portion is formed on an outer peripheral surface of an end of the central horizontal axis. Also, a second threaded portion is formed on an inner peripheral surface of the rotary member and is engaged with the first threaded portion.

Rotation of the knob compresses the compressed elastic body between said holders. The amount of a restoring force is adjusted to an appropriate one by the rotation of the knob. The adjustment can be conducted corresponding to various weights of photographing devices, which facilitates the application of the counterbalancing unit to various photographing devices.

As another preferred modification, this invention provides a counterbalancing unit which includes at least one auxiliary elastic body provided between the longitudinal axis and at least one of the holders. The auxiliary elastic body biases the at least one of the holders inwardly of the longitudinal axis. In this case, the auxiliary elastic force helps the knob adjust the restoring force. An elastic force of the auxiliary elastic body reduces a torque created when rotating the knob. Even a light torque causes the knob to rotate, resulting in a smooth rotating operation.

EMBODIMENTS

Referring to the drawings, a counterbalancing unit for a tripod head of the present invention will be further described in detail.

Figure 1:
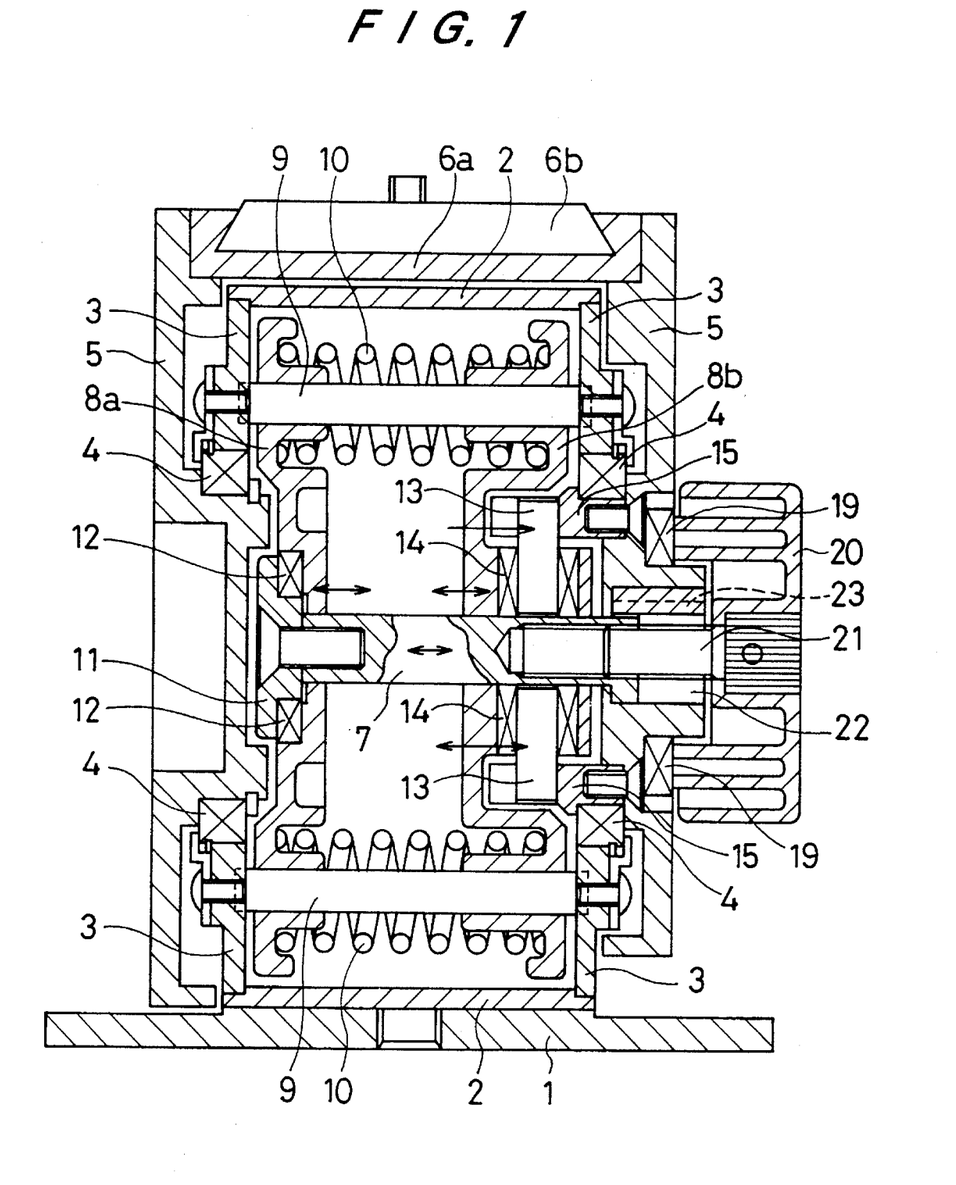
FIG. 1 is a cross sectional view depicting one embodiment of a counterbalancing unit.

As depicted in FIG. 1, a base (1) of a tripod head and a longitudinal axis (2) are integrated. The longitudinal member or axis (2) is vertically disposed on the base (1). A cap (3) having a central opening is fixed on both the right-hand and the left-hand sides of the longitudinal member or axis (2). Struts (5) are connected within the center opening of the cap (3) through a bearing (4). A camera mount (6a) and a mounting plate (6b) for mounting a photographing device such as a camera, a video camera or a movie camera are provided on the top portion of a pair of right-hand and left-hand struts (5). Thus, the struts (5) can be tilted in a vertical direction under a support of the cap (3) fixed on the longitudinal axis (2). This allows the photographing device to be tilted.

A central horizontal shaft or axis (7) is disposed in the middle of the tripod head and corresponds to the central axis around which the struts (5) are tilted. This horizontal axis (7) is designed so as to move only in a horizontal direction. A pair of right-hand and left-hand holders (8a) and (8b) are provided in the longitudinal member or axis (2) and slidably arranged on the central horizontal shaft or axis (7). A plurality of coaxial shafts (9) are provided between the holders (8a) and (8b). These shafts (9) extend through the holders (8a) and (8b) horizontally and both ends of each shaft are fixed on the caps (3). The holders (8a) and (8b) are disposed on the shafts (9). Springs (10) are compressed between the holders (8a) and (8b), and an elastic force of the springs biases the holders (8a) and (8b) outward. The left-hand holder (8a), therefore, comes into contact with a washer (11) provided on the left-hand end of the horizontal central shaft axis (7) through a bearing (12). There is no particular limitation with regard to the specific number of the shafts (9) and the springs (10). For example, the number of shafts (9) and springs (10) can be chosen in accordance with the weight of a photographing device to be mounted. Two guide pins (13), one of which extends upward from the central shaft and the other of which extends downward from the central shaft, are connected with a side of the right-hand holder (8b) by a bearing (14). These guide pins (13) are slidable along the longitudinal axis (7) together with the holder (8b). In some case, only one guide pin (13) may be provided. The guide pin (13) can extend upward or downward. Further, the direction in which the guide pin (13) extends may be horizontal and the number of the guide pines (13) is variable.

A rotary member (15) is fixed on the right-hand tiltable strut (5). The edge of the rotary member (15) comes into contact with the side of the guide pins (13) under the elastic force of the springs (10) disposed between the holders (8a) and (8b). The rotary member (15) is provided for pushing the guide pins (13) along with the holder (8b) inwardly of the caps (5).

Figure 2A:
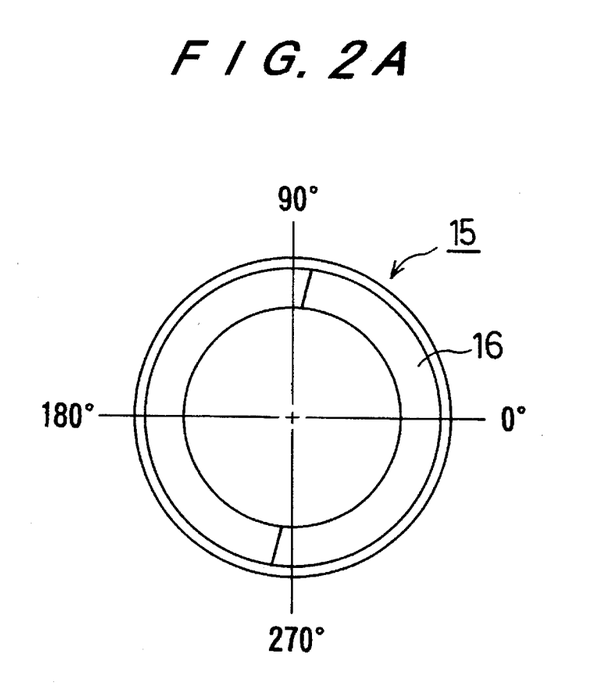
FIGS. 2A, 2B and 2C are a plan view, a cross sectional view, and a side view depicting one embodiment of a rotary member, respectively.
Figure 2B:
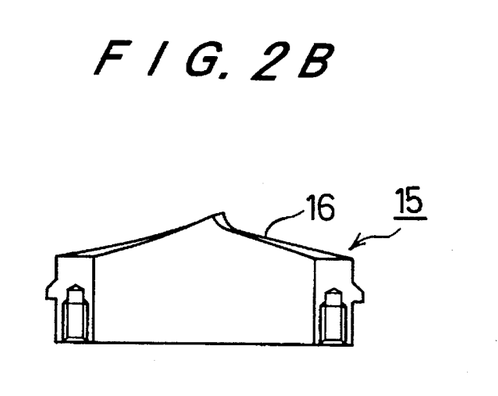
Figure 2C:
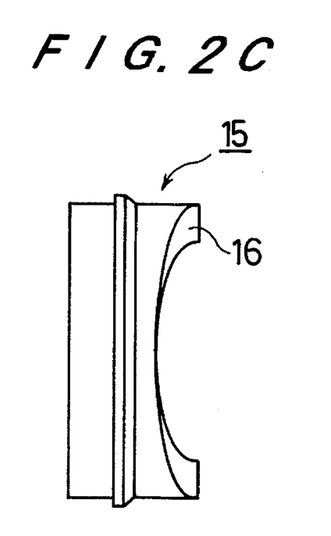
Figure 3:
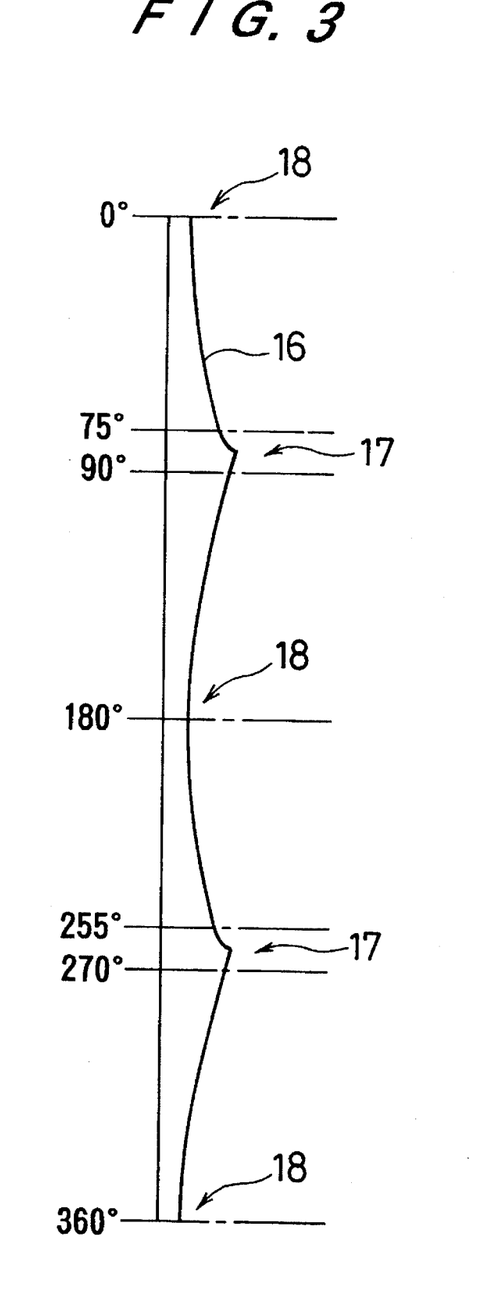
FIG. 3 is a development elevation depicting a cam face of a rotary member in FIG. 2.

As depicted in FIGS. 2A, 2B and 2C these figures, for example, the rotary member (15) has a cam face (16). The cam face (16) is formed into a smooth curved face and contacts the side of the guide pins (13). More specifically, as depicted in FIG. 3, the cam face (16) is formed into a curved face repeating an undulation in the cycle of 90 degree. The undulation allows the tripod head to be tilted within the limited range of the tilting rotation. The tripod head can be tilted 90 degrees forward and 75 degrees backward. In this embodiment, mountain portions (17) correspond to the peaks of the tilting rotation and valley portions (18) are interposed between the mountain portions (17) and correspond to a non-tilting state. The mountain and valley portions (17) and (18) are disposed in 90 degree cycles. This permits the cam face (16), in contact with the side of the pins (13), to be smoothly transformed from a valley portion (18) to a mountain portion (17) and causes the guide pins (13) to move horizontally along a central axis of the cap (3) of the longitudinal member (2), namely, in the left-hand direction of FIG. 1. Such a cyclic surface permits mountain portions (17) and valley portions (18) to be disposed in a rotation symmetry as illustrated in FIG. 2A. In the embodiment of FIG. 1 where the guide pins (13) extend symmetrically relative to the central shaft, the rotary member (15) comes into contact with the respective guide pin (13) and pushes each pin to move it in a horizontal direction. The shapes can be arbitrarily chosen depending on the location, the number and the distance of the movement of the guide pins (13). It is possible, for example, to design the shape of the cam face (16) to correspond to a tilting rotation ranging 90 degrees forward and backward.

In an embodiment of FIG. 1, a knob (20) is rotatably mounted by means of a bearing (19) in front of the right-hand strut (5). The knob (20) is designed for adjusting the amount of a restoring force in proportion to the weight of a photographing device to be mounted. A threaded member (21) having a threaded portion at an end is connected to the knob (20). A threaded hole is formed in an end face at the right-hand end of the central horizontal shaft (7). The threaded hole has a threaded portion which is engaged with the threaded portion of the threaded member (21). The right-hand end of the central horizontal shaft (7) is slidably connected with a key way (23) formed in a space (22) in the center of the strut (5). When the knob (20) is rotated, the threaded member (21) which is engaged with the threaded hole of the horizontal axis (7) rotates with the knob 20. Consequently, the horizontal axis (7) moves horizontally toward the space (22), i.e., in the right-hand direction of FIG. 1. Then, the left-hand holder (8a) which is accompanied by the washer (11) disposed at the left-hand end of the horizontal axis (7), moves horizontally along the shafts (9). This movement of the holder (8a) in the right-hand direction compresses the springs (10) between the holders (8a) and (8b), increasing the elastic force of the springs (10) and generating an increased restoring force while the tripod head is tilted. The restoring force may be increased to balance a torque created during a tilting rotation in the case where the weight of a photographing device to be mounted on a tripod head is heavy. The amount of the restoring force is adjusted relative to the weight of the photographing device. Such an adjustment of the restoring force can be conducted before or after a photographing device is mounted on a tripod head. Alternatively, the adjustment can be conducted during a tilting rotation. The operation of the unit is simple and easy.

The operation of the counterbalancing unit will now be described.

When a photographing device such as a camera, a video camera or a movie camera which is mounted on the camera mount (6a) through the mounting plate (6b) is tilted, the struts (5) and the rotary member (15) concurrently rotate. The horizontal axis (7) rotates with the washer (11) and the knob (20) according to the tilting rotation of the struts (5). The rotation of the horizontal axis (7) is smooth because of the bearings (12) and (19). The cam face (16) at the edge of the rotary member (15), in the initial state, is in contact with the side of the guide pins (13) at the valley portions (18) as illustrated in FIGS. 2 and 3. The cam face rotates toward the mountain portions (17) in accordance with the tilting rotation. The guide pins (13) are horizontally moved in the left-hand direction of FIG. 1 by the rotation of the cam face (16). The cam face (16) of the rotary member (15) transforms from the valley portions (18) to the mountain portions (17) which causes the guide pins (13) to gradually move in the left-hand direction on the central horizontal shaft (7). The horizontal movement of the guide pins (13) is accomplished smoothly through the bearings (14). The right-hand holder (8b) horizontally moves in the left-hand direction along the shafts (10) and on the central horizontal shaft (7). These movements of the guide pins (13) and the holder (8b) are concurrently performed. The springs (10) are gradually compressed between the holders (8a) and (8b) in accordance with the horizontal movement of the holder (8b) toward the left-hand side. The springs (10) are further compressed and the elastic force increased in accordance with the tilting rotation of the photographing device. Consequently, the restoring force becomes large. The further the photographing device is tilted, the further the center of gravity is shifted, which creates a large torque. As described in the above, the restoring force becomes larger to balance the increasing torque and therefore, the photographing device is always in a counterbalanced state. Because of the constant counterbalanced state, the possibility of the photographing device unexpectedly rotating and falling off is avoided. The restoring force is adjustable to correspond to various weights of the photographing device. On the other hand, when moving the photographing device back into the initial state, the rotary member (15) rotates in the opposite direction to the direction mentioned above. The guide pins (13) are pushed back together with the holder (8b). The guide pins (13) slide back toward the right-hand side of FIG. 1 keeping in contact with the cam face (16) provided at the edge of the rotary member (15). Concurrently, the elastic force of springs (10) is gradually decreased, and therefore, the restoring force is also decreased. The restoring force corresponds to the state of the tilting rotation and is always in proportion to the torque. The counterbalancing unit for a tripod head of the present invention generates an appropriate restoring force in proportion to a torque generated during the tilting rotation so that a photographing device may be tilted stably and smoothly. In addition, the structure of the counterbalancing unit is so simple that a tripod head is easily manufactured at a reduced cost.

Figure 4:
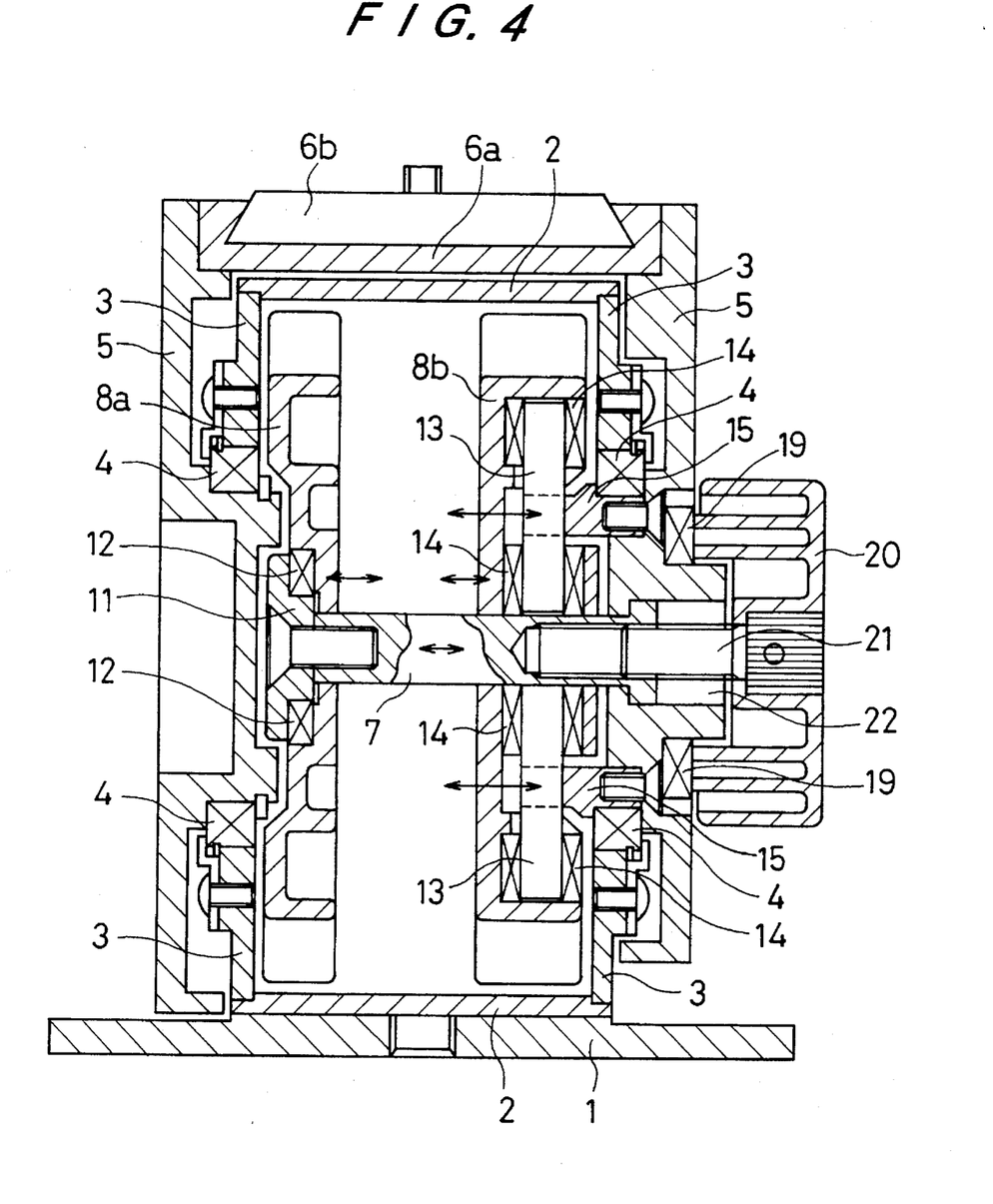
FIG. 4 is a cross sectional view depicting another embodiment of a counterbalancing unit.

As depicted in FIG. 4, both ends of guide pins (13) are connected with a right-hand holder (8b) via a bearing (11). This ensures more stable movement of the guide pins (13). This embodiment has a similar structure to that shown in FIG. 1 with respect to the other elements. Although shafts and springs are not illustrated in FIG. 4, these elements are provided between a pair of holders (8a) and (8b). A key way is also provided at an inner peripheral portion of a space (22).

Figure 5:
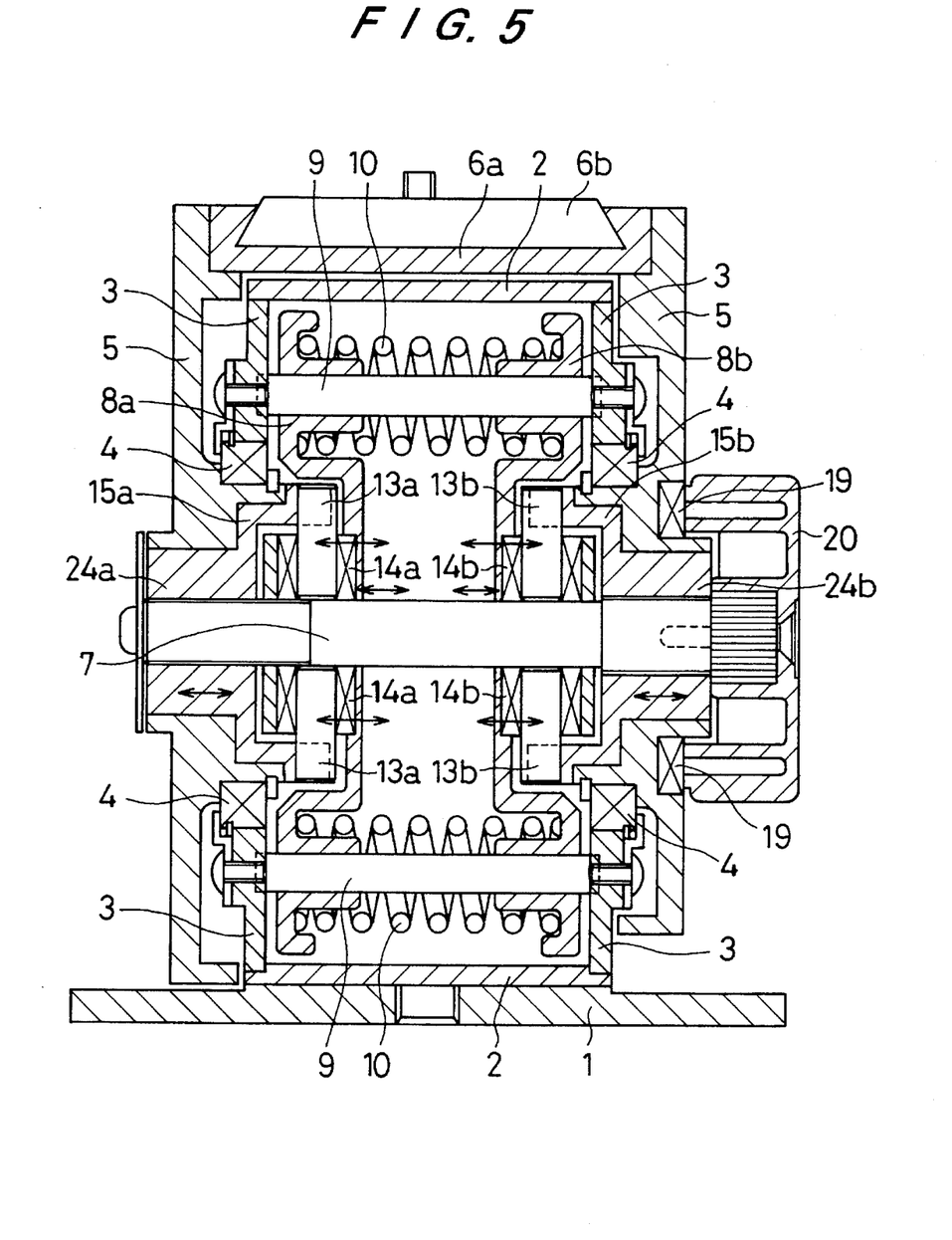
FIG. 5 is a cross sectional view illustrating further another embodiment of a counterbalancing unit.

As illustrated in FIG. 5, a pair of guide pins (13a) and (13b) are connected with a side of holders (8a) and (8b), respectively. This respective pair extends upward and downward along the side of the holders (8a) and (8b). Two rotary members (15a) and (15b) each have a cam face at an edge thereof and are disposed face to face on a central horizontal shaft (7). The cam face of these rotary members (15a) and (15b) comes into contact with a side of the guide pins (13a) and (13b). These rotary members (15a) and (15b) are movably connected with tiltable struts (5). The rotary members (15a) and (15b) are horizontally moved according to rotation of a knob (20). In the embodiment of FIG. 5, unlike the embodiments of FIGS. 1 and 4, the central horizontal shaft (7) rotates but does not move horizontally. More specifically, the knob (20) is fixed to a right-hand end of the central horizontal shaft (7) and rotation of the knob (20) causes the central horizontal shaft (7) to rotate. First threaded portions (24a) and (24b) are symmetrically formed at an outer peripheral surface of both ends of the central horizontal shaft (7), respectively. Second threaded portions are formed at an inner peripheral surface of the rotary members (15a) and (15b) which are disposed opposite to the first threaded portions (24a) and (24b). The second threaded portions are engaged with the first threaded portions (24a) and (24b). When the knob (20) is rotated, the central horizontal shaft (7) rotates and the rotary members (15a) and (15b) relatively move along the central horizontal shaft (7). This movement of the rotary members (15a) and (15b) causes the holders (8a) and (8b) to move relatively along shafts (9). The restoring force is adjustable relative to the weight of a photographing device.

The restoring force applied at the time of the tilting rotation in the embodiment of FIG. 5, as well as in those of FIGS. 1 and 4, varies depending on the torque generated, and therefore a counterbalanced state is always maintained. The rotary members (15a) and (15b) rotate according to the tilting rotation, pushing the guide pins (13a) and (13b) inwardly toward the caps (3) of the outer cylindrical member (2). As the holders (8a) and (8b) move inwardly along the shafts (9), the springs (10) are compressed. A restoring force increases in harmony with an increase of a torque due to the tilting rotation. On the other hand, when a photographing device is returned to the original state, the rotary members (15a) and (15b) rotate in opposite directions at the same time when the struts (5) return. The holders (8a) and (8b) are pushed back toward the cap (3) under the effect of the elastic force of the springs (10). The guide pins (13a) and (13b) come back to the original position while keeping in contact with the cam faces of the rotary members (13a) and (13b). Concurrently, the elastic force becomes smaller in proportion to decrease of the torque, and thereby, the counterbalancing state is maintained.

Figure 6:
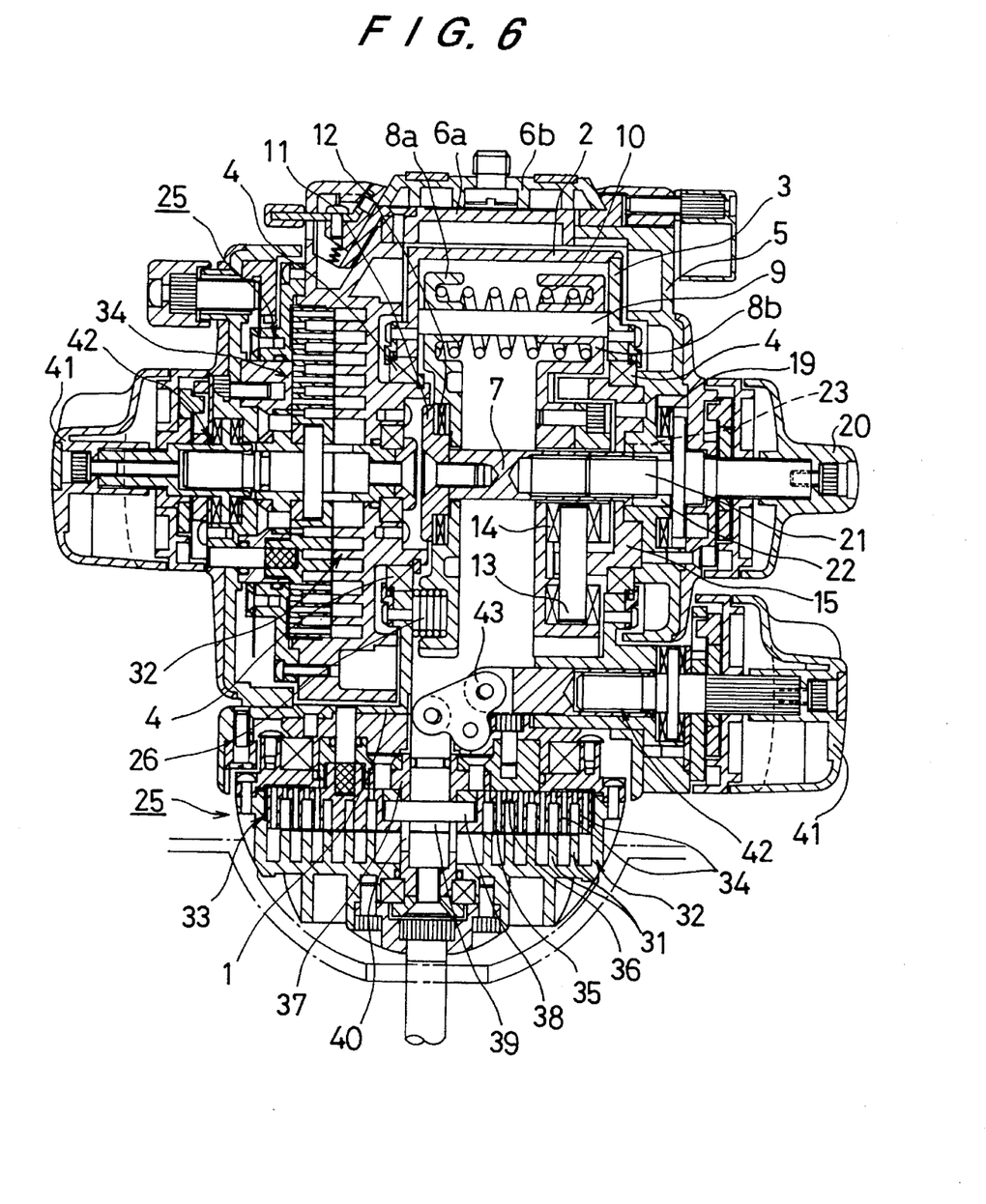
FIG. 6 is a cross sectional view illustrating further another embodiment of a counterbalancing unit.

As illustrated in FIG. 6, a counterbalancing unit fundamentally has the same structure as that of the unit depicted in FIG. 1. However, a left-hand cap (3) is integrated with an outer longitudinal member (2). In this embodiment, a tripod head is assembled by a counterbalancing unit and drag units (25) which are connected with a left-hand side and a bottom of the outer longitudinal member (2), respectively.

In this embodiment, an auxiliary spring (26), different from springs (10), is provided between the holder (8a) located at the left-hand side of the longitudinal axis (2) and a left-hand side of the outer longitudinal member (2) corresponding to the left-side cap (3) in FIG. 1. This auxiliary spring (26) is designed to exert an elastic force so as to push the holder (8a) toward the right-hand side of FIG. 6, namely, toward the holder (8b). The auxiliary spring (26) allows a knob (20) to be smoothly operated to adjust a restoring force and has a function of helping a central horizontal shaft (7) in the right-hand direction of FIG. 6 when causing the restoring force of springs (10) to increase. For this reason, the torque necessary to rotate the knob (20) is reduced, and the knob (20) is easily rotated. When decreasing the restoring force, the auxiliary spring (26) is compressed without preventing springs (10) from recovering elastically. A sudden expansion of the springs (10) is alleviated. A stress imposed on guide pins (13) and a rotary member (15) is alleviated, and the life span of those members is prolonged. Operational reliability is stably ensured.

Location of the elastic body, such as the auxiliary spring (26), is not limited to that shown in the embodiment of FIG. 6. The elastic body may be arranged between a holder (8b) and a right-hand cap (3). There is no particular limitation with regard to the number of the elastic bodies. The number may be appropriately selected in view of the restoring force generated during a tilting rotation.

A counterbalancing unit described in the above may be combined with a drag unit (25), and such a combination realizes a tripod head having multiple functions.

A drag unit (25), as depicted in FIG. 6, is a means for modifying a rotating speed into an appropriate one during horizontal panning and tilting rotations of a tripod head. The drag unit (25) provided at the bottom of the outer longitudinal member (2) is for horizontal panning rotation, while the drag unit (25) on the left-hand side of the longitudinal axis (2) is for tilting rotation.

A case (32), having a plurality of projections (31) coaxially extending from a disposed at an inner surface of the case, is provided with the drag unit (25). A braking disc (33) is provided in the case (32) and moves in the direction of the projections (31). A plurality of projections (34) are also coaxially provided with the braking disc (33) and are also inserted in spaces between the projections (31) of the case (32) and between the most outer projection and an inner side of the case (32). Through holes (35) and (36) are formed through projections (34) and the bottom of the braking disc (33). In the drag unit (25) for the horizontal panning rotation, this braking disc (33) is connected so as to rotate with the rotation of a tripod head. On the other hand, in the other drag unit (25), the case (32) rotates with the tripod head during a tilting rotation.

The case (32) is sealed and an inner sealed space of the case (32) is filled with viscous fluid such as grease. When the braking disc (33) or the case (32) is rotated with a horizontal panning or tilting rotation, a viscous resistance is generated to exert braking force against the rotation of a tripod head.

The braking disc (33) slides along a support shaft (37) in the drag units (25). The position of braking disc (33) in the case (32) can be altered in order to adjust the braking force. More specifically, the braking force increases as the projections (34) of the braking disc (33) are further engaged with the projections (31) of the case (32). On the other hand, the less the engagement of the projections (31) and (34) becomes, the smaller the braking force is. The changes of engagement between projections (31) and (34) are realized by sliding the braking disc (33) along support shaft (37). During the slide of the braking disc (33), the viscous fluid filled in the case (32) flows through the through holes (35) and (36) and does not impede the slide of the braking disc (33).

In addition, the braking disc (33) is connected with a sliding shaft (39) by means of a pin (38). A long hole (40), through which the pin (38) extends, is provided in a side of the support shaft (37), and the sliding shaft (39) is slidable within the range of the length of the long holes (40) along an inner surface of the support shaft (37). The sliding shaft (39) supports the braking disc (33) through the pin (38) during a sliding movement. Further, the sliding shaft (39) is connected with an operating knob (41) disposed in front of the tripod head via a transmission mechanism (42). The braking force is adjusted by rotating the operating knob (41).

A threaded portion is provided on the transmission mechanism (42), through which rotation of the operating knob (41) is transmitted to the sliding shaft (39) to move a tip of the sliding shaft (39) forward and backward. With regard to the movement of the tip of the sliding shaft (39), the structure of the transmission mechanism (42) is slightly different for a horizontal panning rotation and for a tilting rotation. In a braking means (32) for the horizontal panning rotation, a drag operating plate (43), which is rotatable in a vertical plane, is provided and transforms a horizontal slide of the threaded portion into linear vertical movement of the sliding shaft (39). This is because it is impossible to connect the threaded portion with the tip of the sliding shaft (39) directly in the drag unit for the horizontal panning rotation. On the other hand, the threaded portion of the transmission mechanism (42) is directly connected with the tip of the sliding shaft (39) in the drag unit for the tilting rotation.

The combination of such the drag unit (25) and the counterbalancing unit greatly improves operability of a tripod head.

As described above in detail, the present invention provides a simple counterbalancing unit which generates an appropriate restoring force in proportion to a torque created during a tilting rotation. It is possible to stably and smoothly tilt a photographing device such as a camera, a video camera or a movie camera. The restoring force can be adjusted relative to the weight of the photographing device. Operability is improved and manufacturing cost is reduced.

The present invention is not restricted to the foregoing embodiments. Various modifications in detail are possible, for example, the kind and the number of elastic bodies, the location and the number of guide pins or the shape of holders and rotary members may be modified.

What is claimed is:

1. A counterbalancing unit comprising:

a base;

a longitudinal member connected to said base;

a central horizontal shaft extending through said longitudinal member and having a first end and a second end, said first end having an interiorly threaded bore;

a first strut rotatably supported on said longitudinal member and surrounding said first end of said central horizontal shaft;

a second strut rotatably supported on said longitudinal member;

a mounting plate supported by said first and second struts;

a rotary member connected to said first strut and having a cam face, said rotary member coaxially surrounding said central horizontal shaft;

a first holder slidably mounted on said first end of said central horizontal shaft;

a second holder fixedly connected to said second end of said central horizontal shaft;

at least one pin connected to said first holder and operatively engaged with said cam face;

at least one elastic body located between and compressed by said first and second holders;

a rotatable knob having an exteriorly threaded member engaged with said threaded bore of said first end of said central horizontal shaft, wherein rotation of said knob moves said central horizontal shaft to increase or decrease the compression of said at least one elastic member.

2. The counterbalancing unit as claimed in claim 1, further comprising:

at least two horizontally extending members positioned within and connected to said longitudinal member, said horizontally extending members each being radially spaced from said central horizontal shaft and projecting through said first and said second holders; and at least two elastic bodies, each elastic body located on one of said horizontally extending members, wherein each of said elastic bodies is engaged and compressed by said first and second holders.

3. The counterbalancing unit as claimed in claim 1, further comprising at least one auxiliary elastic body provided between said longitudinal member and one of said holders to bias said holder inwardly of said longitudinal member.

4. A counterbalancing unit comprising:

a base;

a longitudinal member fixedly connected to said base;

a central horizontal shaft extending through said longitudinal member and having a threaded first end and a threaded second end;

a first holder slidably supported on said first end of said central horizontal shaft;

a second holder slidably supported on said second end of said central horizontal shaft;

a first strut rotatably supported on said first end of said longitudinal member;

a second strut rotatably supported on said second end of said longitudinal member;

a first rotary member having a cam face and a threaded opening engaging said threaded first end of said central horizontal shaft;

a second rotary member having a cam face and a threaded opening engaging said threaded second end of said central horizontal shaft;

at least one guide pin connected to said first holder and being in operative engagement with said cam face of said first rotary member;

at least one guide pin connected to said second holder and being in operative engagement with said cam face of said second rotary member;

at least one elastic body disposed between said first and second holders; and a rotatable knob connected with said first end of said central horizontal shaft, wherein rotation of said knob simultaneously moves said first and second holders inwardly or outwardly along said central horizontal shaft to adjust the compression force of said at least one elastic body.

5. The counterbalancing unit as claimed in claim 4, further comprising:

at least two horizontally extending members radially spaced from said central horizontal shaft, wherein each said member projects through said first and second holders;

at least two elastic bodies disposed on each of said horizontally extending members, wherein each of said elastic bodies is engaged and compressed by said first and second holders.

6. The counterbalancing unit as claimed in claim 4, further comprising at least one auxiliary elastic body provided between the longitudinal member and one of said holders to bias one of said holders inwardly of said longitudinal member.

* * * * *